United States Patent

Bundschuh

[15] 3,648,952

[45] Mar. 14, 1972

[54] CARTRIDGE

[72] Inventor: John Bundschuh, Rochester, N.Y.

[73] Assignee: Eastman Kodak Company, Rochester, N.Y.

[22] Filed: May 23, 1968

[21] Appl. No.: 736,524

Related U.S. Application Data

[63] Continuation-in-part of Ser. No. 685,588, Nov. 24, 1967, abandoned.

[52] U.S. Cl. ..............................242/197, 242/71.1, 242/205

[51] Int. Cl. ..........................................................G03b 23/02

[58] Field of Search..................242/197, 198, 205, 206, 207, 242/208, 71.1, 71.2, 199, 200, 55.19 A; 206/52 F; 220/4 E, 60; 352/72, 78

[56] References Cited

UNITED STATES PATENTS

| | | | |
|---|---|---|---|
| 3,495,787 | 2/1970 | Wallace | 242/199 |
| 3,517,896 | 6/1970 | Kral | 292/197 |
| 2,464,673 | 3/1949 | Debrie | 242/71.2 |
| 2,899,097 | 8/1959 | Haskins | 220/4 E UX |
| 3,092,346 | 6/1963 | Goodell et al. | 242/197 |
| 3,227,387 | 1/1966 | Laa et al. | 242/198 |

*Primary Examiner*—George F. Mautz
*Assistant Examiner*—Milton Gerstein
*Attorney*—Robert W. Hampton and G. Herman Childress

[57] ABSTRACT

A cartridge for receiving a reel containing motion picture film or other strip material comprises two separate cartridge parts which are latched together in such a manner that they resist inadvertent opening when the parts are subject to a separating force. Interlocking surface formations at the interface between the cartridge parts limit lateral movement along the interface between the cartridge parts. The inner surface of one of the cartridge parts contains structure which serves to centralize the reel within the cartridge and which blocks improper insertion of the reel into the cartridge. Locating means on the cartridge and on a motion picture projector assures proper positioning of the cartridge on the projector. Nibs and mating recesses are provided at the interface between the cartridge parts to prevent undesirable distortion of the cartridge sides. A retractable spindle for a projector permits mounting of a cartridge in a direction perpendicular to the axis of the spindle.

29 Claims, 19 Drawing Figures

PATENTED MAR 14 1972

3,648,952

JOHN J. BUNDSCHUH
INVENTOR.

BY Robert W. Hampton
G. Herman Childress
ATTORNEYS

JOHN J. BUNDSCHUH
INVENTOR.

BY Robert W. Hampton
T. Herman Childress
ATTORNEYS

JOHN J. BUNDSCHUH
INVENTOR.

BY Robert W. Hampton
J. Herman Childress
ATTORNEYS

JOHN J. BUNDSCHUH
INVENTOR.

BY Robert W Hampton
G. Herman Childress
ATTORNEYS

JOHN J. BUNDSCHUH
INVENTOR.

BY Robert W Hampton
G. Herman Childress
ATTORNEYS

JOHN J. BUNDSCHUH
*INVENTOR.*

BY G. Herman Childress
Robert W Hampton
ATTORNEYS

CARTRIDGE

CROSS-REFERENCE TO RELATED APPLICATIONS

This application is a continuation-in-part of U.S. Pat. application, Ser. No. 685,588, entitled "Cartridge," filed in the name of John J. Bundschuh on Nov. 24, 1967 and now abandoned. Reference is made to the following commonly assigned U.S. Pat. applications: Ser. No. 643,503, entitled "Cartridge for Reel of Strip Material," filed July 5, 1967, in the names of John J. Bundschuh et al. now U.S. Pat. No. 3,536,276; U.S. Pat. application Ser. No. 685,631, entitled "Reel and Film Retaining Means," filed on Nov. 24, 1967 in the name of Evan A. Edwards et al., now U.S. Pat. No. 3,465,980; and application Ser. No. 685,616, entitled "Cinematographic Projector or the Like and Cartridges for Use Therewith," filed on Nov. 24, 1967 in the name of John J. Bundschuh et al., now U.S. Pat. No. 3,552,683.

BACKGROUND OF THE INVENTION

This invention relates to cartridges adapted to receive reels containing strip material and to be mounted onto a motion picture projector or the like, and to a projector constructed for receiving the cartridges.

Two-piece cartridges for reels of motion picture film or the like are well known in the art. These cartridges suffer from several disadvantages, particularly when the intended user does not possess a high degree of skill in the use of mechanical equipment. For example, reels containing motion picture film must be properly positioned within the cartridge to avoid binding of the reel with respect to the cartridge, and prior cartridge constructions do not necessarily require proper insertion of the reel within the cartridge. Moreover, the means for latching the cartridge parts together have not proved satisfactory when the cartridge is subject to some forces tending to separate the cartridge parts. For example, some prior art latches for cartridges become disengaged when the cartridge is dropped, thus permitting the cartridge parts to separate and a film reel to fall from the cartridge. This is not only aggravating and permits dirt and other foreign material to be lodged on the film, but it also requires the user to rewind the film and properly insert it within the cartridge which, as previously noted, have proved difficult when the user is not mechanically inclined. It has also been found desirable to provide some means for limiting lateral movement between the cartridge parts along the interface of the cartridge parts in order to prevent inadvertent opening of the cartridge. Moreover, it is essential that the cartridge be properly located on a projector or the like, and it is preferable that this be accomplished by locating means which is effective yet structurally comparatively simple.

SUMMARY OF THE INVENTION

Accordingly, among the several objects of the invention may be noted the provision of a cartridge construction for film reels which will resist most accidental separating forces normally encountered, such as by dropping of the cartridge; the provision of a two-piece cartridge wherein relative shifting along the interface between the parts is minimized; the provision of a cartridge for a reel of film or the like wherein improper insertion of the reel is avoided; the provision of a cartridge construction which is easily mountable in the proper position on a motion picture projector or the like; the provision of a cartridge construction which is structurally simple, comparatively easy to use, substantially foolproof in operation, compact, and compatible with a variety of projector mechanisms; and the provision of projector constructions which permits a cartridge to be mounted thereon and which cooperates with portions of the cartridge for locating the cartridge on the projector. Other objects of the invention will appear from the following description of the invention.

A cartridge of the invention comprises two cartridge parts having recesses therein which jointly define a reel receiving chamber when the parts are assembled together. One aspect of the invention relates to means for latching the parts together so that accidental or inadvertent separation of the parts is avoided. In another aspect the invention relates to means for properly locating the flanges of a reel within the chamber in the cartridge. In yet another aspect of the invention relates to means at the interface between the parts for limiting relative movement between the parts along the interface therebetween. In a still further aspect the invention relates to means for properly locating the cartridge on a motion picture projector or the like. The invention is also directed to means for limiting distortion of a cartridge wall, and to the provision of a retractable spindle construction which allows mounting of the cartridge on the projector in a direction perpendicular to the axis of the spindle.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
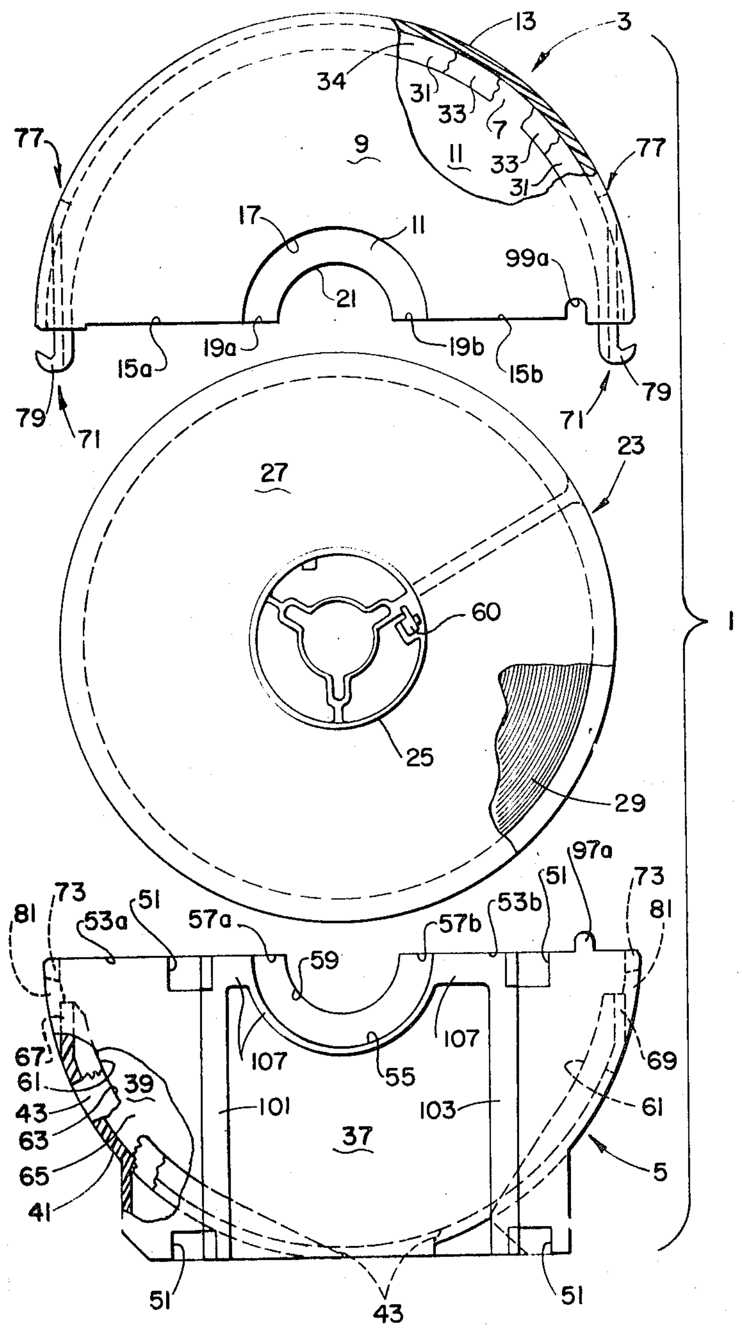
FIG. 1 is an exploded elevation, partially broken away, of a preferred embodiment of a cartridge of the invention and showing a reel containing motion picture film or the like between the cartridge parts.

Referring to the drawings, a cartridge 1 of the invention comprises two separate cartridge halves or parts 3 and 5. The upper cartridge part 3 has a generally semicylindrical recess 7 therein defined by a pair of thin, substantially semicircular walls 9 and 11 which are held in spaced and generally parallel planes by an arcuate wall 13, the latter closing the top of part 3. The lower edge of wall 9 has substantially straight end portions 15*a* and 15*b* separated by a centrally located semicircular notch portion 17. Similarly, the lower edge of wall 11 has substantially straight end portions 19*a* and 19*b* separated by a centrally located semicircular notch portion 21, the latter being coaxial with and somewhat smaller in diameter than the notch 17 in wall 9. The difference in diameters of the notches provide means for properly orienting a reel 23 in the cartridge as explained later.

Reel 23 comprises a hub 25 and a pair of spaced, generally parallel annular flanges 27. A length of strip material 29, such as motion picture film, is wound on hub 25 between the flanges. Preferably, the diameter of the flanges 27 exceeds the diameter of the strip material on the hub so that there is a narrow annular space between the flanges at their outer extremity that is free of film. A pair of spaced, generally semicircular rails 31, 33 project radially inwardly from end wall 13 of part 3. These rails are spaced apart by a distance less than the spacing between the inner surfaces of reel flanges 27 so that the rails can project into the space between the reel flanges to prevent clock springing of the strip material beyond the outer periphery of the reel flanges as disclosed in the beforementioned U.S. Pat. No. 3,536,276. The outer portions of the reel flanges are received in spaces 34 between the rails and the walls 9 and 11.

Cartridge part 5 has a recess 35 defined by a pair of thin, generally parallel, substantially semicircular walls 37 and 39 which are held in spaced relation by an arcuate end wall 41 at the outer perimeter of part 5. The lower portion of end wall 41 is slotted as shown at 43 to provide access for means for stripping film from reel 23. The film stripping means may comprise part of a motion picture projector such as described in the beforementioned U.S. Pat. No. 3,552,683. A more detailed description of the shape of slot 43 and its function is set forth in the beforementioned patent application Ser. No. 643,503.

The upper edge of wall 37 comprises straight end portions 53*a* and 53*b* separated by a semicircular centrally located notch portion 55. Similarly, the upper edge of wall 39 comprises straight end portions 57*a* and 57*b* separated by a semicircular notch portion 59, the latter being coaxially aligned with the corresponding portion 55 on wall 37. As best shown in FIG. 1, the radius of notch 59 is somewhat smaller than the radius of notch 55, and notches 55 and 59 have the same radius of curvature as notches 17 and 21, respectively, of part 3. When the parts are assembled together, the notches are aligned and jointly form two coaxial circular holes at opposite sides of the cartridge. When the cartridge is positioned on a projector, the projector spindle (not shown) passes through the larger of the holes into the hub 25 of the reel for rotating the reel within the cartridge. Edges 15*a*, 15*b*, 19*a*, 19*b*, 53*a*, 53*b*, 57*a* and 57*b* form the interface between the cartridge parts when they are assembled together.

Preferably, a reel pin 60 retains an end of the film on the reel and projects laterally beyond one of the flanges 27. The pin is spaced from the axis of the reel hub by a distance which is greater than the radius of notches 21, 59, but less than the radius of the notches 17 and 55. This positioning of the pin requires that the reel be inserted into the cartridge in the manner shown in FIG. 1 since any attempted insertion while the reel is reversed (i.e., with its axis rotated 180° from the position shown in FIG. 1) will be blocked by engagement of the pin with the edges of notches 21 and 59. A more detailed construction of the pin and its mounting on the reel are described in the beforementioned copending Patent Application entitled "Reel and Film Retaining Means."

Figure 2:
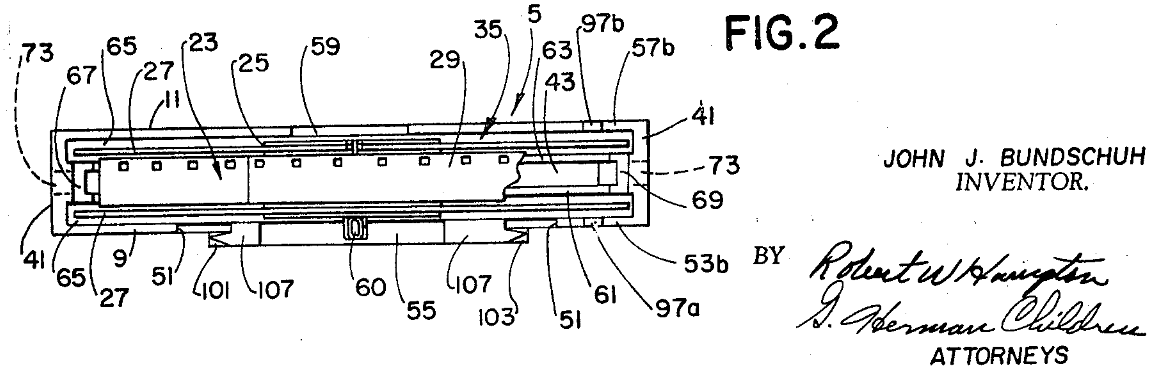
FIG. 2 is a plan of the lower cartridge part shown in FIG. 1.
Figures 3, 4:
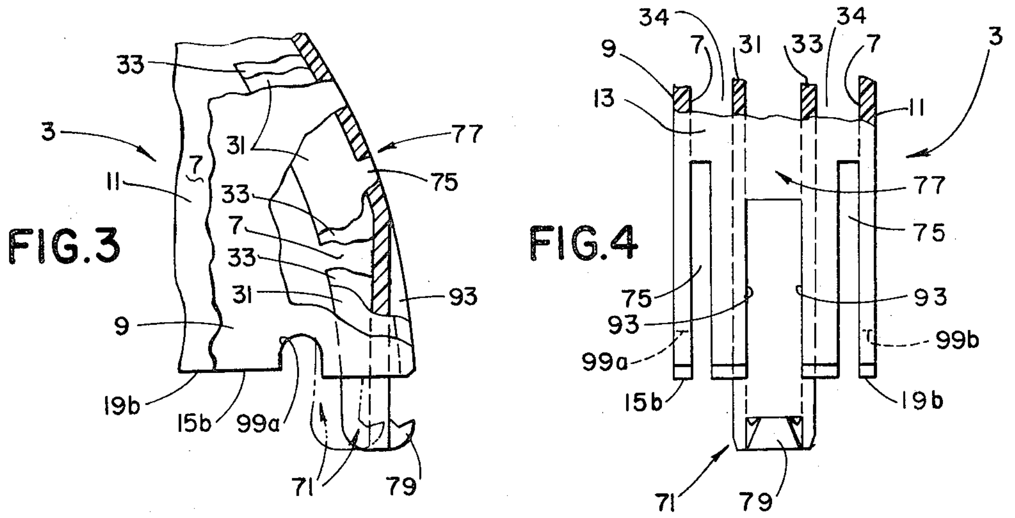
FIG. 3 is an enlarged fragmentary elevation, partially broken away, showing a portion of the latching structure for holding the cartridge parts together.
FIG. 4 is a fragmentary end view taken from the right side of FIG. 3.

Cartridge part 5 has a pair of spaced, generally semicircular rails 61 and 63 which project radially inwardly from wall 41 into the recess 35. As shown in FIGS. 1, 5, 7, 8 and 17, the ends of rails 61, 63 are spaced from the upper edges of part 5. Rails 61, 63, as well as rails 31, 33 in part 3, are each spaced from the adjacent semicircular cartridge walls, thereby providing in each cartridge part a pair of axially spaced annular spaces or openings. The openings in part 5 are both designated 65. The axially outer surfaces of the rails 31, 33 and 61, 63 are spaced apart by a distance less than the spacing between the inner surfaces of the reel flanges 27 so that when the reel is positioned within the cartridge the reel flanges are received in openings 34 and 65. Thus, rails 31, 33, 61 and 63 project into the area between the reel flanges to prevent clock springing of the strip material 29 beyond reel flanges. The rails also control the axial position of the reel within the cartridge. As shown in FIG. 2, reel 27 fits loosely within the substantially cylindrical chamber jointly formed by recesses 7 and 35 in the cartridge parts so that the reel is free to rotate with respect to the cartridge during unwinding and rewinding of the film on the reel.

Means are preferably provided for making improper insertion of the reel into the cartridge substantially impossible, i.e., to prevent insertion of the radially outer portion of the reel flanges 27 into any portion of the cartridge other than the openings 34 and 65. In accordance with the present invention, this is accomplished by means of two cross-ribs 67 and 69 which extend from the end wall 41 upwardly and inwardly between the end portions of rails 61 and 63. The innermost ends of the ribs project into the recess 35 substantially the same distance as the rails 61 and 63. As is apparent from FIGS. 1 and 2, the spacing between the ribs is less than is required for insertion of the reel flanges into cartridge part 5. Thus the ribs block improper insertion of reel flanges 27 into the cartridge by requiring insertion of the outer portion of the reel flanges into the openings 65 at the sides of the rails.

The cartridge parts are securely fastened together to form a substantially integral unit by means of latch structure comprising a tongue 71 on each end of part 3 which is adapted to be interlocked with a latch member shown in the form of a bar 73 at each end of the cartridge part 5. Since the latch structure at one end of the cartridge parts is the mirror image of the latch structure at the other end of the parts, a detailed description of one tongue and bar will suffice for both. Referring to FIGS. 3–8, a pair of spaced slots 75 at the sides of the tongue extend into each end of wall 13 from adjacent the walls 9 and 11. The material forming the wall 13 is relatively thin and flexible so that the tongue can flex about a hinge area 77 between the inner ends of the slots. Tongue 71 can be deflected to the position shown in phantom in FIG. 3 by inwardly directed finger pressure on the lower or free end of the tongue. The material forming the tongue is also resilient so that when the deflecting finger pressure is removed, it tends to return to its normal solid line position. The rails 31, 33 extend to the free end of the tongue and serve to stiffen the tongue and encourage return of the tongue to its normal position.

Figures 5, 6, 7, 8:
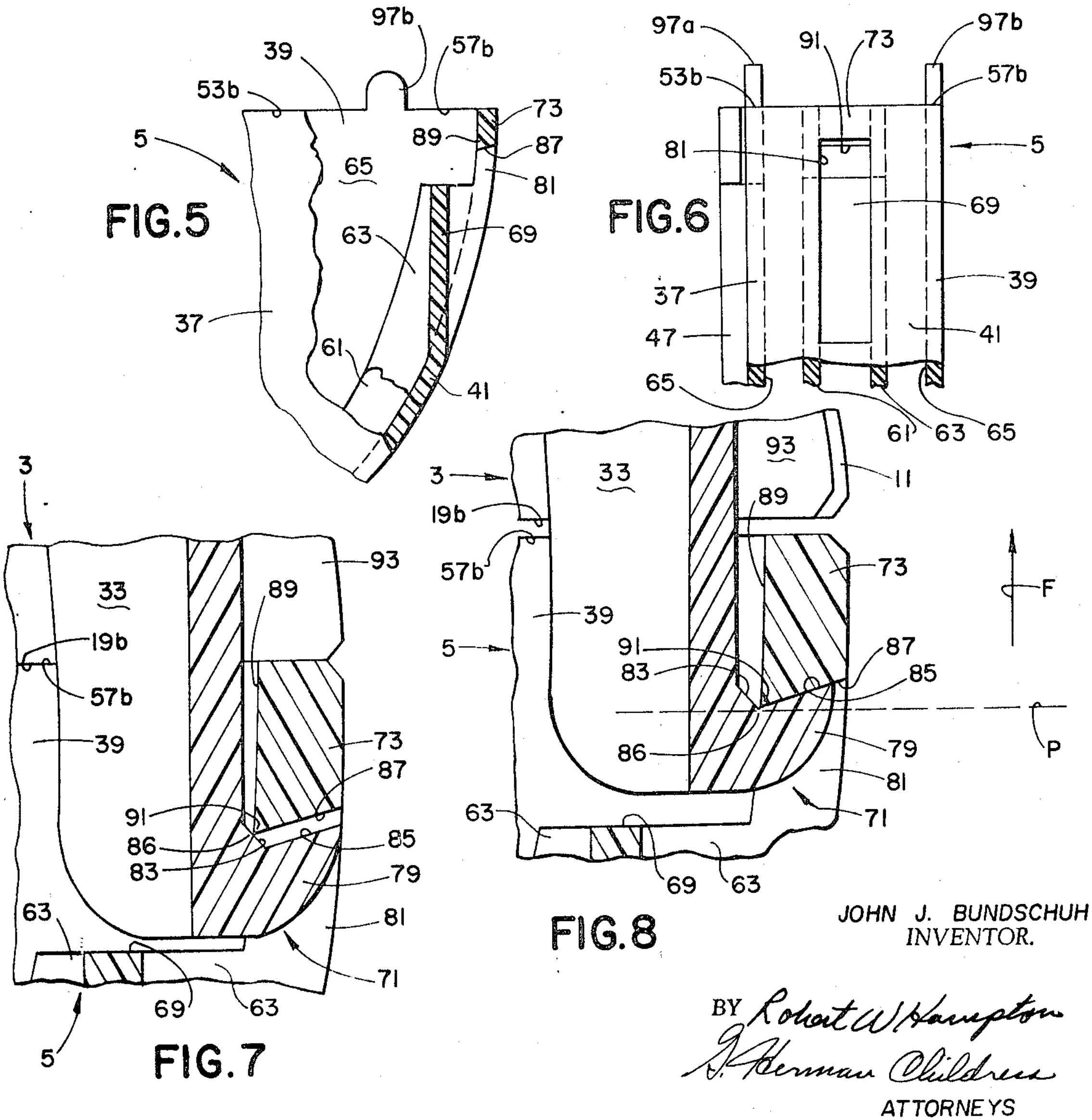
FIG. 5 is an enlarged fragmentary elevation, partially broken away, showing an end portion of the lower cartridge part and another portion of the latching structure.
FIG. 6 is a fragmentary end view taken from the right side of FIG. 5.
FIG. 7 is a greatly enlarged fragmentary section showing the cartridge latch structure in its normal engaged position.
FIG. 8 is a view similar to FIG. 7 showing the latching structure when the cartridge parts are subject to a separating force.
Figure 9:
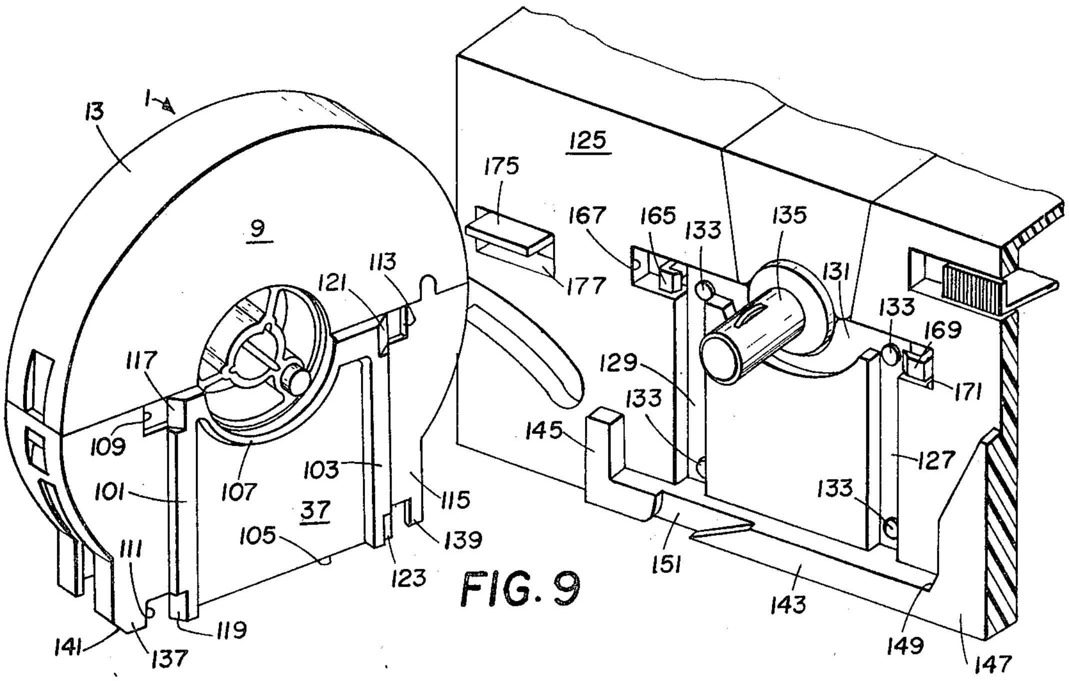
FIG. 9 is a perspective illustration of the cartridge and a portion of a projector which cooperates with the cartridge to locate and support the latter on the projector.

The free end of the tongue projects below the lower edges of walls 9 and 11 and it is generally in the shape of a hook 79. When the cartridge parts are latched together part of hook 79 is received in an opening 81 beneath bar 73. The opening 81 is preferably only slightly wider than the portion of the hook which enters the opening to minimize relative lateral movement between the cartridge parts. Hook 79 has a V-shaped latching surface formed by two flat surfaces 83 and 85 that intersect along a line designated 86. Surfaces 83 and 85 preferably define an included obtuse angle of about 130°. FIG. 8 shows an imaginary plane P passing through line 86 substantially parallel to the interface between the cartridge parts 3 and 5. Surfaces 83 and 85 are inclined away from plane P and toward a plane along the interface between the cartridge parts. Surface 85 is preferably located at an acute angle of about 5° with respect to plane P and surface 83 is positioned at an inclined acute angle of about 45° with respect to plane P.

Bar 73 comprises a lower edge surface 87 which is substantially parallel to surface 85 when the parts are latched together. The rear surface 89 of bar 73 is inclined at an angle of about 85° with respect to surface 87, and surfaces 87 and 89 intersect along a relatively sharp edge 91.

Referring to FIGS. 7 and 8, when the parts are latched together surface 83 of the tongue engages bar edge 91 and prevents the tongue from completely returning to its unflexed position. Therefor the tongue exerts a biasing force against edge 91 in a direction which is substantially parallel to plane P. Because surface 83 is inclined at an angle of about 45° with respect to this force, there is a resulting component of force acting on the tongue which urges the tongue downwardly (as viewed in the drawings), thereby effecting and maintaining tight engagement between the cartridge parts at the interface therebetween. The inclination of surface 83 on the tongue with respect to edge 91 on the bar assures this dynamic latching engagement.

The assembled cartridge is sometimes subject to a load having a force component F that is essentially perpendicular to plane P and to the interface between the cartridge parts 3 and 5. Force F tends to separate the cartridge parts from their assembled relation. The latch surfaces 83 and 85 are positioned with respect to bar 73 so that they not only tend to maintain contact between the cartridge parts along their interface, but also so that the separating force F is effectively counteracted.

This results from the relation between the V-shaped surface comprising surfaces 83 and 85 and the latch member 73. When the magnitude of force F is sufficiently great, surface 83 on the tongue will slide along edge 91 until the edge is seated along the line 86 between surfaces 83 and 85. This results in some separation between the cartridge parts as shown in FIG. 8. In order for any further separation to occur, the tongue 71 first must be moved downwardly to allow surface 85 to clear the edge 91 on the tongue, and this movement is opposed by separating force F. Thus, the separating force itself prevents inadvertent unlatching of the tongue 71 with respect to bar 73 and effectively prevents complete separation of the parts. This unique latching action is due in part to the inclination of surface 85 upwardly with respect to plane P toward the interface between the parts.

Referring to FIGS. 3, 4, 7 and 8, a pair of outwardly projecting flanges 93 at the sides of the outer face of the tongue are generally coplanar with surfaces 15 and 19 on walls 9 and 11. The lower end of these flanges engage the upper surface of bar 73 when the parts are latched together as shown in FIG. 7. Similarly, surfaces 15 and 19 abut surfaces 53 and 57, respectively, along the innerface between parts 3 and 5 when the parts are latched together.

In order to assemble parts 3 and 5 together, the tongues 71 are deflected inwardly into recess 7 in part 3 by exerting finger pressure on the outer surfaces of the tongues. Then with the tongues deflected, the hooks are placed in part 5 until surfaces 15 and 19 on part 3 bear against surfaces 53 and 57, respectively, on part 5. The hook 79 of each tongue is then aligned with an opening 81, and the tongues are released. The resilient nature of the tongues cause them to spring outwardly, forcing the hooks into openings 81 and against bars 73. As an alternative to the above procedure, the hook at one end of part 3 can be inserted into its opening 81 without deflecting the tongue. Then the tongue at the other end of part 3 is deflected inwardly by finger pressure and, using the engaged latch as a hinge or fulcrum, the deflected tongue is swung into part 5 and released, thereby engaging the other latch.

The cartridge parts 3 and 5 are preferably provided with interlocking surface formations at the interface between the parts which cooperate when the parts are fastened together for limiting relative movement between the parts along the interface therebetween, i.e., in a direction substantially perpendicular to the axis of the reel 23 and the cylindrical chamber defined by recesses 7 and 35. The interlocking surface formations best illustrated in FIGS. 1–6 of the drawings comprise a pair of posts 97*a* and 97*b* which project upwardly above surfaces 53*b* and 57*b*, respectively. The posts are spaced between the adjacent end wall 41 and the semicircular recesses 55 and 59 and are preferably aligned with each other as shown in FIG. 2. The outermost end of each post is preferably generally semicircular in shape. The posts are adapted to fit into a pair of mating openings or recesses 99*a* and 99*b* in edge surfaces 15*b* and 19*b* respectively, on part 3. Preferably, the side edges of post 97*a* and 97*b* have a close fit with the corresponding portions of the recesses 99*a* and 99*b*. It will be observed that the posts in their mating recesses are provided at only one end portion of the cartridge parts. This arrangement prevents assembly of the parts unless they are arranged with respect to each other in the manner shown in FIG. 1. Thus this construction of the interlocking surface formations not only limits relative shifting between the two parts to an acceptable level, it also insures correct orientation of the parts when they are assembled.

Means are preferably provided on the cartridge for accurately locating the cartridge on the face of a projector. By way of example, the projector may be of the type described in the beforementioned U.S. Pat. No. 3,552,683. This locating means is best illustrated in FIGS. 1 and 9–11 and comprises a pair of spaced and generally parallel ribs 101 and 103 on wall 37. The ribs extend from the lower edge 105 upwardly to the upper edges 53*a* and 53*b*, respectively, of cartridge part 5. These ribs are joined by a transverse rib 107 which projects from wall 37 and extends along the periphery of the notch 55. There are four openings 109, 111, 113 and 115 through wall 37 near the upper ends and lower ends of the ribs 101 and 103 and at the outer side of the ribs. The ribs are preferably generally channel shaped except at the upper and lower edges where inclined chamfered surfaces 117, 119, 121, and 123 slope inwardly toward the adjacent one of the openings 109, 111, 113 and 115.

The cartridge is adapted to be mounted on the surface of a plate 125 comprising part of a motion picture projector. The plate has a pair of spaced and generally parallel channel-shaped grooves or recesses 127 and 129 joined at their upper ends by a generally arcuate recess 131. The spacing, shape and dimensions of the recesses 127, 129 and 131 are such that ribs 101, 103 and 107, respectively, fit snugly within the recesses. The close fitting engagement between the sides of ribs 101, 103 and the walls of the recesses or grooves establishes and maintains the lateral position and angular or rotational orientation of the cartridge with respect to plate 125. Preferably, contact pads 133 are provided in the bottom of the grooves. The relation between the pads and ribs 101, 103 is such that the loaded cartridge is properly located in parallel relation to the plate 125 and the reel in the cartridge is in proper alignment with a take-up reel (not shown) on the projector when the ribs are in contact with the pads. The projector has a spindle 135 which fits within the core of the reel hub when the cartridge is properly positioned on plate 125. Engagement between the pads and ribs 101, 103 also establishes the axial location and the perpendicularity of the cartridge and reel with respect to the spindle. Proper vertical positioning of the cartridge is established by the bottom of rib 107 engaging the wall defining the bottom of recess 131.

Other means for properly locating the cartridge on the projector comprise feet 137 and 139 on the cartridge laterally outwardly from the ribs 101 and 103. Preferably, the lower part of the side of foot 137 is beveled as shown at 141 while the corresponding part of foot 139 is perpendicular to the bottom 105 of the cartridge. These feet are adapted to fit into mating recesses formed by bars 143, 145, and 147 which project outwardly from the surface of plate 125 on the projector. The beveled edge 141 and a corresponding inclined surface 149 of the projector prevent reversed mounting of the cartridge on the projector. Bar 143 has a notch 151 in it to provide a path for film being unwound from the reel inside the cartridge.

Figure 10:
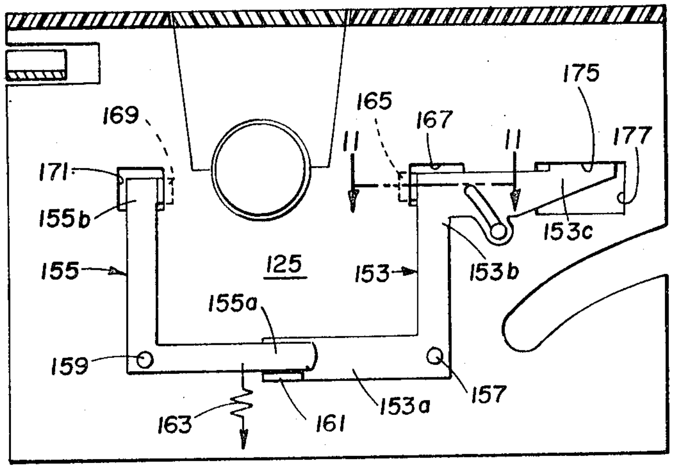
FIG. 10 is an elevation of the opposite side of the portion of the projector shown in FIG. 9 and depicting a mechanism for releasably latching the cartridge on the projector.
Figure 11:
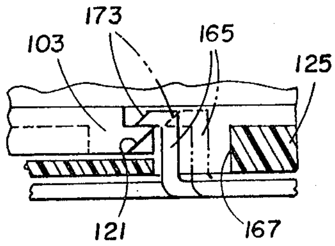
FIG. 11 is an enlarged fragmentary section taken along line 11—11 of FIG. 10.

The cartridge is held against the surface of plate 125 by clamping means best illustrated in FIG. 10. The clamping means shown comprises a pair of bell crank levers 153 and 155 which are pivoted at 157 and 159, respectively, on the back of plate 125. One arm 153*a* of lever 153 carries a contact plate 161 at its outer end. The outer end of the corresponding arm 155*a* of lever 155 is biased against plate 161 by a compression spring 163. The other arm **153*b* has at its outer end an offset clamping portion 165 which extends through a slot 167 in plate 125 as best illustrated in FIG. 11. The spring 163 acting through lever 153 normally biases the clamping member 165 against one end of the slot as shown in solid lines in FIG. 11. However, the clamping member can be moved to its dotted line position in FIG. 11 against the biasing force of spring 163 during mounting of the cartridge on the projector as explained later. Similarly, the arm 155*b* of lever 155 has at its outer end a clamping member 169 which also projects through a slot 171 in a projector plate 125. Clamping member 169 can also be moved against the biasing force of spring 163 during insertion of the cartridge on the projector. The end portion of both clamping members lie in a plane substantially parallel to and spaced from the outer face of plate 125. Preferably, the clamping members each have a beveled outer surface as shown at 173 in FIG. 11 for the member 165**.

Lever 153 has an extension **153*c* which carries a flange 175, the latter projecting through an opening 177 in plate 125. Normally the flange 175 is biased toward the upper edge of opening 177 by the spring 163. The flange can be moved downwardly by finger pressure to cause pivotal movement of lever 153 against the force of spring 163. This movement is imparted to lever 155 due to the engagement of the arm 155*a* with the plate 161. As this occurs, the clamping members 165 and 169** are swung away from each other. This unlatches the cartridge so that it can be removed from the projector.

The cartridge is assembled onto the projector plate 125 simply by aligning ribs 101, 103 and 107 with the respective grooves 127, 129 and 131 and then moving the cartridge in a direction parallel to the axis of spindle 135 until the cartridge abuts plate 125. As this occurs, the beveled surfaces 117 and 121 on the ribs engage the beveled surface on clamps 165 and 169, thereby forcing the clamps outwardly away from each other toward the dotted line position shown for clamp 165 in FIG. 11. Inward movement of the ribs continues until the outer faces of the ribs abut the locating pads 133. During this movement the clamp members clear the beveled surfaces and then snap toward each other under the influence of spring 163 until they reach the position shown in FIG. 11 wherein they are in engagement with the back side of the ribs to prevent removal of the cartridge without first depressing the flange 175. The cartridge can be clamped onto the projector by other suitable means, such as by clamp means adapted to enter other pairs of the openings 109, 111, 113 and 115. Reference is made to the beforementioned U.S. Pat. No. 3,552,683 for a description of clamping means positionable in diagonally opposite ones of the openings.

Figure 12:
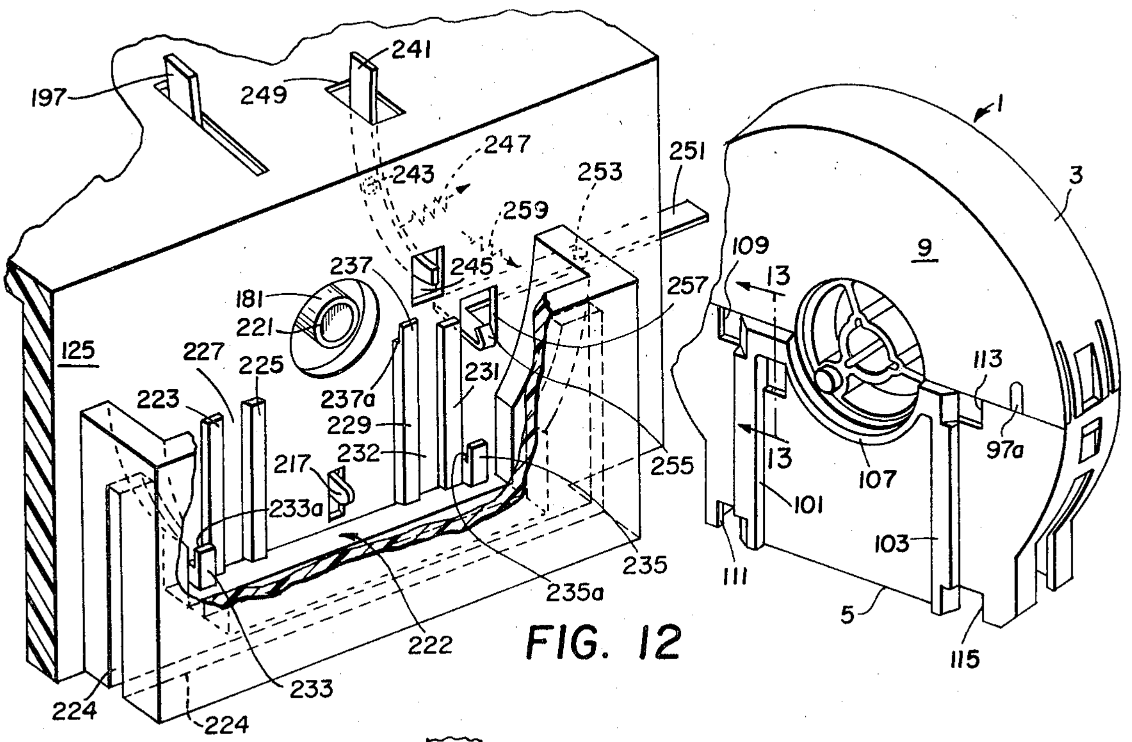
FIG. 12 is a view similar to FIG. 9 showing another embodiment of the locating structure.
Figures 13, 14:
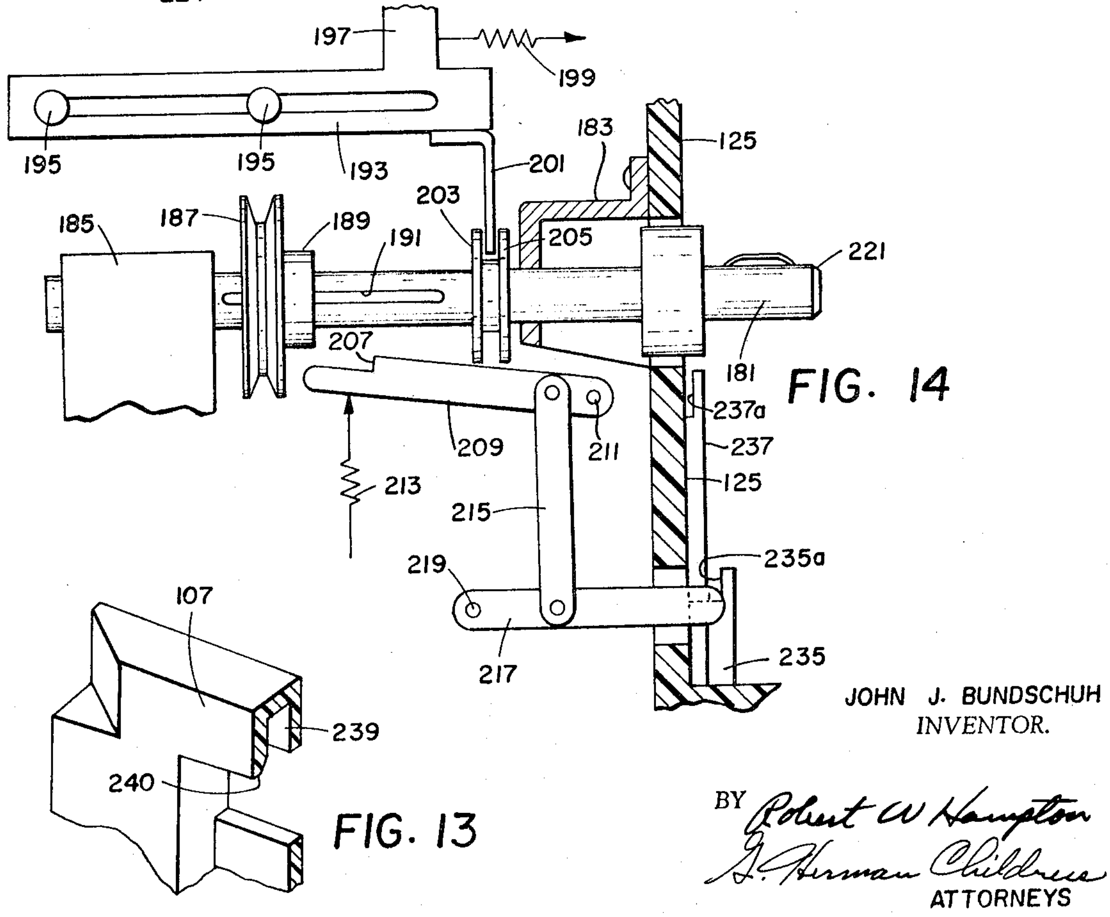
FIG. 13 is an enlarged fragmentary perspective of part of the cartridge locating structure.
FIG. 14 is a view showing part of the FIG. 12 projector structure.

FIGS. 12–14 illustrate modifications of the mounting structure on the projector and on the cartridge. In this embodiment, the cartridge is moved downwardly along face 125 into its mounted position rather than being moved perpendicularly with respect to face 125 as in the previously described embodiment. In order to accommodate the required movement of the cartridge, the spindle is made retractable with respect to plate 125. FIG. 14 illustrates one of the various ways in which this movement of the spindle may be effected. Referring to FIG. 14, the spindle 181 is carried by a pair of bearings 183 and 185 which allow the desired axial movement of the spindle. The spindle is driven by a belt (not shown) trained around a pulley 187 surrounding the spindle. The pulley is carried by a sleeve 189 that is fixed to the spindle by a key (not shown) seated in an axial slot 191 in the spindle surface. This arrangement permits axial movement of the spindle with respect to the spindle driving mechanism.

A slotted plate 193 is mounted for sliding movement on a pair of pins 195 in a direction substantially parallel to the axis of spindle 181. A flange 197 on the plate 193 projects upwardly through the cartridge housing so that it can be manually moved to the left as viewed in FIG. 14. The plate is biased to the position shown in FIG. 14 by a tension spring 199 stretched between the plate and wall 125 of the projector. A finger 201 depending from plate 193 is received between a pair of collars 203 and 205 fixed to the spindle. Thus, movement of the flange 197 to the left produces axial movement of the spindle to the left through bearings 183 and 185 for retracting the outermost end of the spindle into the projector. The spindle is held in its retracted position by engagement between the collar 205 and a shoulder 207 on a latch member 209. The latch is pivoted at 211. Member 209 is biased into its latching position by a compression spring 213 and is moved about its pivot into an unlatched position by a linkage member 215. Link 215 is connected to the latch member and to a release lever 217, the latter being pivoted at 219. A portion of the release lever projects through plate 125 where it is engageable by the cartridge as the cartridge reaches the end of its vertical travel during mounting of the cartridge onto the projector. Downward pressure by the cartridge against the outer end of release lever 217 pulls the linkage 215 downwardly, thereby swinging latch member 209 about its pivot until the collar 205 is disengaged from shoulder 207. The spindle is then returned to its extended position by the biasing force of spring 199. Thus, the lever 217 senses the presence of a cartridge on the projector and effects extension of the spindle in response to positioning a cartridge on the projector. The spindle is preferably frustoconical in shape and its outer end as shown at 221 to facilitate insertion of the spindle through the reel in the cartridge.

Referring now to FIG. 12, the projector has a chamber 222 which receives a cartridge through its open top. A slot 224 permits film stripping means to enter a cartridge in the chamber. The cartridge mounting structure on the projector comprises a pair of spaced, generally parallel vertically extending rails 223 and 225 forming a substantially channel-shaped recess 227. Two similar rails 229 and 231 form a channel-shaped recess 232, the latter being substantially parallel to recess 227. Both recesses are open at their top and they guide the cartridge into place along the face of the projector plate 125 and establish the position of the cartridge on the projector in the same manner as recesses 127 and 129.

Vertical positioning of the cartridge is determined by three latching and locating members 233, 235 and 237. Members 233 and 235 are positioned laterally outwardly from rails 223 and 231, respectively, near bar 143. Latch members 233 and 235 have notches **233*a* and 235*a* which receive the lower portion of cartridge wall 37 at openings 115 and 111, respectively. The upper part of each of latch members 233 and 235 abuts the outer surface of wall 37** to prevent outward movement of the cartridge away from the projector plate.

The latch member 237 is preferably formed in the upper end of rail 229 by providing a notch **237*a* on the rail. This notch is adapted to receive a portion of the cartridge rib 107. As shown in FIG. 13, the rib 107 is preferably undercut to form a downwardly opening recess 239 which receives the upper end of the latch member 237. This interlocking arrangement prevents outward movement of the upper portion of cartridge part 5. The relative dimensions between notch 237*a* and the recess 239 is preferably such that the lower edge 240 of rib 107 is seated at the bottom of the notch when the cartridge is in the desired vertical position. The latch members 233, 235 and 237 jointly locate the cartridge and the reel therein in the desired vertical plane substantially parallel to the outer face of projector plate 125. While the mounting structure on the projector has been described in terms of a single cartridge mounted on a single plate 125**, it will be understood that a plurality of cartridges can be accommodated on the projector or a cartridge carrier by providing the described mounting structure on a series of plates each pair of which are spaced apart sufficiently to accommodate a cartridge therebetween.

Preferably, a retaining latch is provided for avoiding inadvertent upward or vertical movement of the cartridge along the surface of plate 125. Two constructions of such retaining structures are shown in FIG. 12. These comprise a curved lever arm 241 which is pivoted at 243 intermediate its ends. A lower end of the arm 241 projects through a window 245 in plate 125 and it is adapted to engage cartridge part 3 immediately above the rib 107 of the cartridge. The lower end of this arm is biased toward the cartridge by a tension spring 247 connected to the lever arm beneath the pivot 243. The upper end of the arm projects through an opening 249 in the projector housing. The lever arm is withdrawn from the opening for removal of the cartridge by finger pressure directed against the upper end of the lever.

As an alternative to the retaining structure just described, or in addition to such structure, the cartridge may be held in its mounted position by a latching member 251 pivoted at 253 intermediate its ends. One end of the lever has an offset latch portion 255 which projects through a window 257 in plate 125 and is adapted to be received within an opening 109 in cartridge part 5. The latch member is biased toward the opening by compression spring 259 which bears against the lever 251 between pivot 253 and latch member 255. The other end of member 251 projects from the projector housing. The latch portion 255 is withdrawn from the opening by finger pressure directed against the projecting end of the lever.

During assembly of the cartridge on the projector structure shown in FIG. 12, the spindle is first retracted by exerting finger pressure against flange 197. Flange 197 can be released after collar 205 clears shoulder 207 on latch member 209. Then the cartridge is placed above rails 223, 225, 229 and 231 with the cartridge ribs 101 and 103 aligned with the recesses 232 and 227, respectively. Then the cartridge is moved downwardly along the face of plate 125 until the lower edges of the cartridge are received within notches 233*a* and 235*a* and the upwardly projecting portion of latch 237 is received within the recess 239 (FIG. 13) on latch 107 with rib portion 240 seated on the bottom of notch 237*a*. As this movement occurs, the lower end of retaining latch arm 241 and/or the retaining latch member 255 are retracted through plate 125 against their respective biasing forces. When the cartridge is properly located, the lower end of latch member 241 and/or the latch member 255 return to their normal latching position where they prevent inadvertent or accidental upward movement of the cartridge relative to the projector. As the cartridge reaches its lowermost position, its lower edge 105 engages release lever 217 to pull the latch member 209 downwardly, thus releasing the spindle, and spring 199 returns the spindle to its normal extended position. Extension of the spindle is limited by engagement of a pin 195 with the end of the slot in plate 193.

Figure 15:
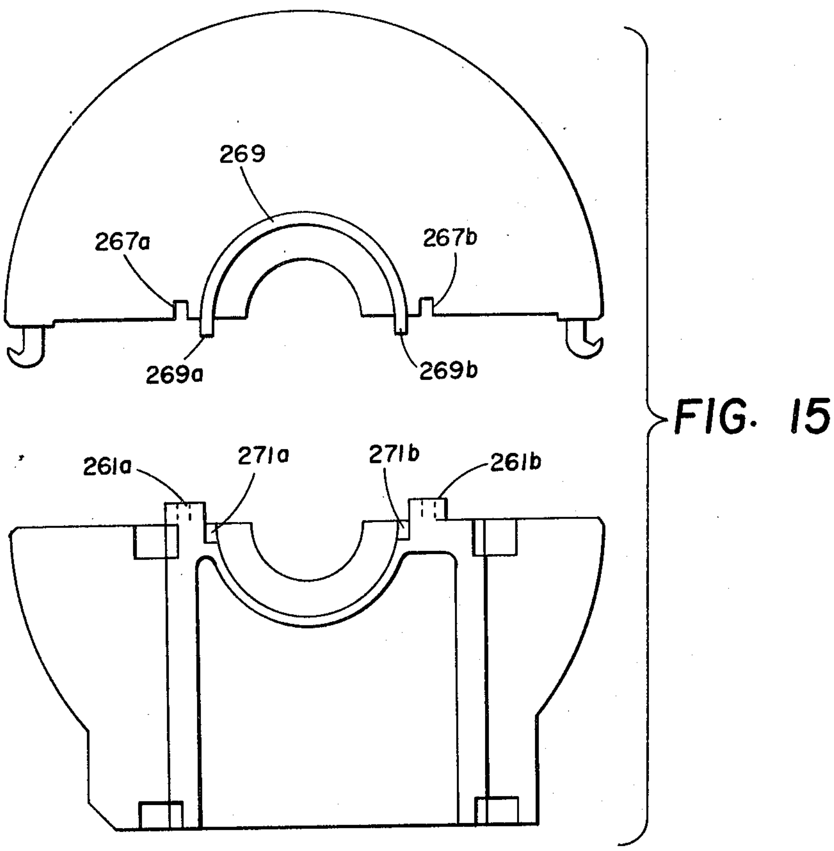
FIG. 15 is a fragmentary view of the cartridge depicting another embodiment of the interlocking structure for limiting shifting of the cartridge parts.
Figure 16:
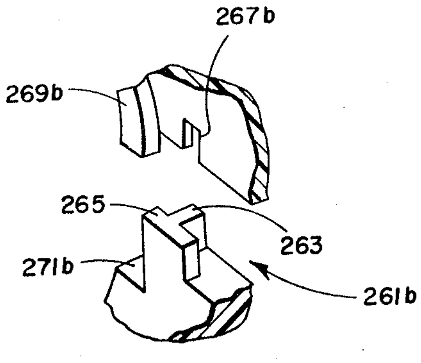
FIG. 16 is an enlarged fragmentary perspective of the interlocking structure shown in FIG. 15.

FIGS. 15 and 16 illustrate another embodiment of the interlocking formations at the interface of the cartridge parts which may be used for limiting movement along the interface between the parts in a direction perpendicular to the axis of the projector spindle and for requiring proper orientation of the cartridge parts prior to assembly of the parts. This alternative interlocking structure comprises generally T-shaped projections 261*a* and 261*b* on the edges 33*a* and 33*b*, respectively, of cartridge part 5. Referring to FIG. 16, each of these projections comprises a base portion 263 and a head portion 265. The base portion of the projections are adapted to be received in mating notches 267*a* and 267*b* in edges 15*a* and 15*b* of cartridge wall 9 with the head portion of each projection abutting the outer surface of wall 9. Thus, this arrangement also limits movement of wall 9 outwardly as well as limiting shifting of the cartridge parts.

Preferably, the cartridge part 3 is provided with a rib 269 which projects outwardly from wall 9 around the periphery of notch 17. The lower end portions 269*a* and 269*b* of the rib project below edges 15*a* and 15*b*, respectively, and are received into mating notches 271*a* and 271*b* in the rib 107. The projecting portions of the rib 269 and the notches in which they are seated coact with the engagement between the projections 261 and notches 267 to limit relative shifting between the cartridge parts along the interface thereof in a direction perpendicular to the axis of the cylindrical space within the cartridge. Since the interlocking means are provided on only one wall of each cartridge parts, the parts must be correctly oriented with respect to each other before the parts can be assembled together.

Figure 17:
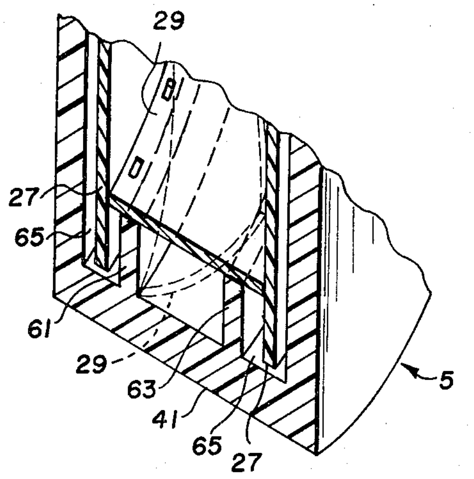
FIG. 17 is a fragmentary perspective view depicting both the normal and undesirable positions of a strip of film in relation to part of the cartridge.
Figure 18:
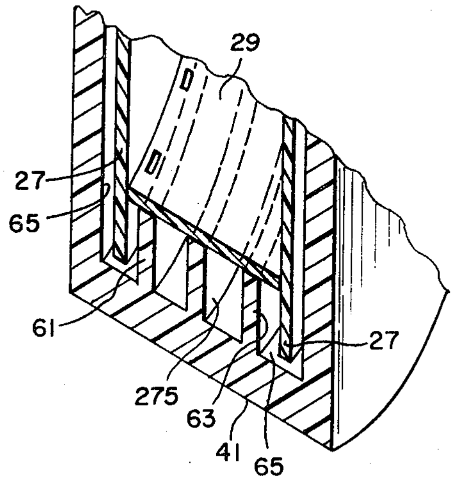
FIG. 18 is a view similar to FIG. 17 illustrating an embodiment of the invention which prevents a film strip from assuming the undesirable position shown in FIG. 17.

As previously indicated, rails 61 and 63 are preferably provided on the interior surface of the cartridge for projecting into the space between reel flanges 27 to prevent clock springing of filmstrip 29 beyond the periphery of the reel flanges. FIG. 17 illustrates in solid lines the desired position that the filmstrip normally assumes in relation to the rails 61 and 63. When only two rails are provided, it is possible for the filmstrip to become cocked or tilted and deflected into the position shown in phantom in FIG. 17 wherein one edge of the film lies between the two ribs. In order to avoid this, the cartridge may be provided with a third rib 275 (FIG. 18) which is positioned between ribs 61 and 63 and which preferably extends circumferentially around the inner surface of the cartridge substantially midway between ribs 61 and 63. With this arrangement, it is very unlikely that the filmstrip will become tilted or cocked as shown in phantom in FIG. 17 even if the reel in the cartridge contains substantially less than the maximum length of film.

Figure 19:
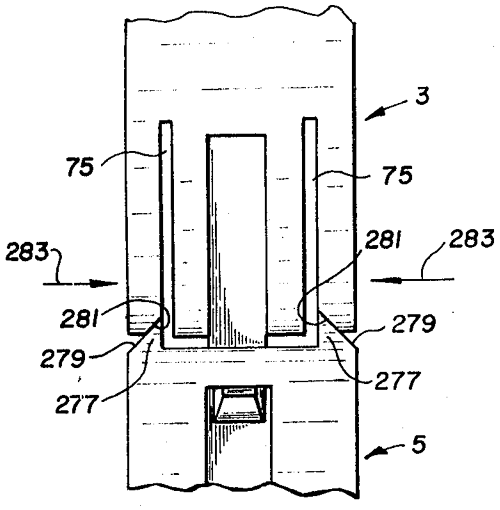
FIG. 19 is an enlarged fragmentary end view illustrating means for limiting distortion of cartridge walls in an inward direction.

The formation of the tongue 71 in end wall 41 of the cartridge results in a pair of slots 75 at the side of the tongues. The front and rear walls of the cartridge are thus unsupported by the end wall in the area of slot 75. The front and rear walls can be deflected or distorted inwardly in this area, and this is undesirable since it could result in the cartridge walls contacting the reel flanges. In order to prevent this deflection or distortion, a pair of nibs or other suitable projections 277 (FIG. 19) are preferably provided on the lower cartridge part 5 along the interface between the end walls of the two cartridge parts. These nibs preferably have outer inclined surfaces designated 279 which slope inwardly and upwardly from the outer surfaces of cartridge part 5. Surfaces 279 are engageable by complementary inclined surfaces 281 on the lower end of the end wall of the upper cartridge part 3. Surfaces 279 and 281 are in close fitting relation when the cartridge parts are latched together to effectively oppose any inwardly directed forces as indicated by arrows 283 which tend to urge the front and rear walls of the cartridge part 3 toward each other. Similar coacting surfaces can be provided at other portions of the cartridge which are subject to distortion or other inwardly directed forces tending to deform the cartridge parts from the desired configuration.

In view of the foregoing description it will be seen that a cartridge has been provided which effectively resists accidental or inadvertent separating forces such as occur when the cartridge is dropped, etc. Also, shifting between the parts is minimized by the interlocking means at the interface between the parts. The construction of the cartridge is such that it is virtually impossible to improperly insert a reel into the cartridge, or to improperly position or orient the cartridge on a projector or the like. These advantages have been achieved by a construction which is comparatively simple and compact, which is very easy to use and essentially foolproof in operation.

Moreover, the cartridge can include means for preventing undesired positioning of film in the cartridge and prevent inward distortion or deflection of the cartridge walls.

The invention has been described in detail with reference to preferred embodiments thereof, but is will be understood that variations and modifications can be effected within the spirit and scope of the invention as described hereinabove and as defined in the appended claims.

I claim:

1. A cartridge for receiving a reel of strip material between a pair of spaced, circular flanges, said cartridge comprising:
   first and second cartridge parts;
   means for fastening said parts together, said parts having means including spaced side walls jointly defining a chamber within the parts when the parts are fastened together, said chamber being adapted to receive a reel; and
   means for properly locating the flanges of a received reel within said chamber, said locating means comprising (1) means on one of said cartridge parts projecting into said chamber between said side walls for defining with said walls a pair of spaced openings for receiving the flanges of a received reel and (2) means extending between said openings for blocking insertion of a reel flange between the openings.

2. A cartridge as set forth in claim 1 wherein the projecting means comprises a pair of spaced rails positioned to be received within the space between the reel flanges for limiting clock springing of the strip material to the space between the flanges.

3. A cartridge as set forth in claim 2 wherein said means extending between said openings comprises cross ribs spanning the space between said rails.

4. A cartridge as set forth in claim 1 wherein the fastening means comprises two spaced latch bars on one of the cartridge parts, and two tongues projecting from the other of said parts and engageable with said bars for holding the parts in assembled relation.

5. A cartridge as set forth in claim 4 wherein said means projecting into said chamber comprises three rails positioned between said walls of said one part of the cartridge.

6. A cartridge comprising:

two cartridge parts, each of said parts having a recess therein;

means for fastening said parts together with portions of said parts defining an interface therebetween and with the recesses therein communicating with each other and jointly defining a chamber adapted to receive a reel carrying strip material;

interlocking surface formations on said cartridge parts at the interface between the parts cooperating when the parts are fastened together for limiting relative movement between the parts along the interface between the parts, said formations including a plurality of projections on one of said parts, said projections having T-shaped cross sectional areas taken in a plane substantially parallel to the plane of said interface, and notches on the other part adapted to receive portions of said projections.

7. A cartridge as set forth in claim 6 wherein said formations are arranged unsymmetrically whereby the parts can be assembled together only when they are correctly oriented with respect to each other.

8. A cartridge comprising:

a pair of cartridge parts;

latch means carried by the cartridge parts for fastening said parts together with portions of said parts defining an interface therebetween, said parts having means including spaced side walls jointly defining a chamber within the parts when the parts are fastened together, said chamber being adapted to receive a reel carrying strip material, said latch means comprising (1) a tongue carried by one of the cartridge parts and (2) a bar carried by the other cartridge part, said tongue having a latching surface engageable with said bar for holding the parts assembled;

means within at least one of the cartridge parts for blocking improper insertion of the reel within the cartridge;

interlocking means along the interface between the parts for opposing relative movement between the parts along the interface therebetween; and means on an outer surface of the cartridge adapted to mate with cooperating structure on a projector or the like for properly locating the cartridge on the projector.

9. A cartridge as set forth in claim 8, further comprising cooperating means carried by said cartridge parts and located thereon with respect to said latch means for limiting deflection of said parts adjacent said latch means.

10. A cartridge comprising:

two cartridge parts;

latch means for holding the parts in assembled relation, said latch means comprising a tongue on one of said cartridge parts and being separated from adjacent portions of said cartridge part by slots extending along side said tongue; and means for preventing deflection of said adjacent portions of said one cartridge part toward said tongue, said deflection preventing means comprising projecting means on the other of said cartridge parts engageable with cooperating means on said one cartridge part.

11. A cartridge as set forth in claim 10, wherein said projecting means comprises a pair of spaced nibs, and said cooperating means comprises a pair of surfaces engageable with said nibs.

12. In the combination of a motion picture projector and a film cartridge, means for locating the cartridge on a surface of the projector, said locating means comprising:

complementary means on the cartridge and the projector for orienting the cartridge relative to the projector surface when the complementary means are in engagement; and cooperating means on the projector and the cartridge for preventing movement of the cartridge with respect to said surface in a direction which would disengage said complementary means.

13. The combination as set forth in claim 12 wherein said complementary means comprises means defining a recess on the projector and an elongate rib on the cartridge positionable within said recess.

14. In the combination of a motion picture projector and a film cartridge, means for locating the cartridge on a surface of the projector, said locating means comprising:

first cooperating means on the projector and the cartridge for locating the cartridge with respect to the projector and for restraining movement of the cartridge in one direction with respect to the projector, second cooperating means on the projector and the cartridge for locating the cartridge with respect to the projector and for restraining movement of the cartridge in the second direction with respect to the projector, and third cooperating means on the projector and the cartridge for locating the cartridge with respect to the projector and for restraining movement of the cartridge in the third direction with respect to the projector, each of said directions being substantially perpendicular to the other two directions.

15. The combination as set forth in claim 14 wherein said first cooperating means comprises an elongate groove in the projector surface and an elongate rib on the cartridge, the rib being substantially the same width as said recess.

16. The combination as set forth in claim 15 wherein said second cooperating means comprises a second elongate rib on the cartridge, the length of said second rib being substantially transverse to said first rib.

17. In the combination of a projector and a cartridge, means for locating the cartridge on the projector, said locating means comprising:

a pair of elongate ribs on one of said cartridge or projector;

means defining a pair of mating recesses on the other of said cartridge and projector for receiving said ribs, the ribs being substantially the same width as said recesses so that the ribs fit closely within said recesses, thereby locating the cartridge on the projector in a direction perpendicular to the length of the ribs and establishing the rotational orientation of the cartridge with respect to the projector;

a third rib between said pair of ribs; and means defining a third recess for receiving the third rib, the third rib and the third recess being located with respect to each other so that engagement between the third rib and an edge of the third recess establishes the position of the cartridge in a direction parallel to the length of said pair of ribs.

18. The combination as set forth in claim 17 further comprising means on one end of said pair of recesses engageable by said pair of ribs for locating the cartridge in a particular plane with respect to the projector.

19. The combination as set forth in claim 18 further comprising clamp means carried by the projector and engageable with the cartridge for holding the cartridge on the projector.

20. A cartridge comprising:
first and second cartridge parts adapted to engage each other at an interface therebetween and having means jointly defining a chamber for receiving a reel of strip material;
a tongue carried by said first part;
two substantially flat latching surfaces on said tongue disposed at an obtuse angle with respect to each other, each of said surfaces facing generally toward said interface; and
means defining an opening in said second part adapted to receive part of said latching surfaces of said tongue, said opening being separated from the interface between said parts by a bar against which one of said flat latching surfaces reacts when said parts are fastened together and said parts are subject to a force tending to separate them at the interface.

21. A cartridge as defined in claim 20 wherein the interface defines a plane and said flat latching surfaces:
intersect along a line parallel to the plane of the interface; and
project away from the same side of an imaginary plane which includes said line and is parallel to the plane of the interface, said surfaces extending from said line toward the interface whereby said latching surface on said tongue must be moved away from said bar and into said chamber to disengage said latching surface from said bar.

22. A cartridge as defined in claim 21 wherein:
said bar has an edge thereon;
said one flat surface is positioned with respect to said edge so that a central portion of said one flat surface is engageable by said edge when the cartridge parts are in engagement with each other at the interface; and
said tongue is formed of flexible material and is held in a flexed condition by engagement between said one flat surface and said edge, whereby contact between said one flat surface and said edge produces a component of force acting through said tongue for biasing said first cartridge part toward said second cartridge part for maintaining tight engagement between the parts at the interface.

23. A cartridge as defined in claim 22 wherein said cartridge parts define a pair of spaced substantially parallel walls joined by other wall means when fastened together;
said tongue is integrally formed with said wall means of said first part and is flexible with respect to said parallel walls; and
a rail projects parallel to said parallel walls from said tongue into said chamber.

24. A cartridge as set forth in claim 23 further comprising means for locating the cartridge on a projector or the like, said locating means comprising a pattern of surface formations on the cartridge adapted to mate with corresponding formations on a projector or the like.

25. A cartridge comprising:
first and second cartridge parts adapted to engage each other at an interface therebetween and having means jointly defining a chamber receiving a reel of strip material;
a tongue carried by said first part;
a latching surface on said tongue;
means defining an opening in said second part adapted to receive part of said latching surface of said tongue, said opening being separated from the interface between said parts by a bar against which said latching surface reacts when said parts are fastened together and said parts are subject to a force tending to separate them at the interface; and
means for properly locating a reel of strip material within said chamber, said locating means comprising (1) means projecting into said chamber in one of said cartridge parts for defining a pair of spaced openings along side said projecting means for receiving reel flanges, and (2) means extending between said spaced openings for preventing insertion of a reel flange between said spaced openings.

26. A cartridge comprising:
two cartridge parts, each of said parts having a recess therein;
means for fastening said parts together at an interface therebetween with said recesses communicating with each other and jointly defining a chamber adapted to receive a reel of strip material;
interlocking surface formations on said cartridge parts at the interface which cooperate when the parts are fastened together for limiting relative movement between the parts along the interface, said interlocking surface formations comprising (1) a rib on one of the cartridge parts and a pair of spaced notches in the other of said parts, the end portions of said rib being engageable in said notches.

27. A cartridge comprising:
first and second cartridge parts adapted to engage each other at an interface therebetween and having means jointly defining a chamber for receiving a reel of strip material;
a tongue carried by said first part;
means defining slots in said first part adjacent said tongue to permit movement of said tongue relative to said first part;
a latching surface on said tongue;
means defining an opening in said second part adapted to receive part of said latching surface of said tongue, said opening being separated from the interface by a bar against which said latching surface reacts when said parts are fastened together and said parts are subject to a force tending to separate them at the interface;
means on said first and second parts for preventing deflection of the portion of said first part adjacent said slot, said deflection preventing means comprising (1) means projecting from one of said parts at the interface between said parts adjacent said slots, and (2) complementary means on the other part at the interface for contacting said projecting means to prevent deflection of said first part at the location of said slots.

28. A motion picture projector adapted to receive and mount on a surface thereof a cartridge containing a reel of motion picture film, said projector comprising:
means on said projector defining a chamber adapted to receive and position a cartridge adjacent said surface
a spindle for supporting a reel within a received cartridge;
means mounting said spindle for movement between (1) an extended position wherein said spindle is engageable with a reel in a received cartridge, and (2) a retracted position wherein said spindle is located with respect to said chamber to allow free movement of the cartridge into or out of said chamber in a direction transverse to the axis of said spindle; and
means on the projector for cooperating with the cartridge for accurately locating the cartridge on the projector in the desired position with respect to said spindle so that said spindle can engage a reel in the cartridge when said spindle is moved from its retracted to its extended position, said locating means comprising an elongate recess on the projector adapted to cooperate with an elongate rib on the cartridge, said recess extending in a direction parallel to the direction of movement of the cartridge into and out of said chamber.

29. A motion picture film cartridge for use with a projector of the type having a surface with first and second transverse elongate grooves and a clamp, said film cartridge comprising:
first and second elongate ribs positionable within the first and second grooves, respectively, whereby said cartridge is located on the surface in directions perpendicular to the lengths of said ribs; and
means engageable by the clamp for locating the cartridge in a predetermined plane with respect to the surface of the projector.

* * * * *